May 6, 1969 B. H. PINCKAERS 3,443,124
MODULATING CONDITION CONTROL SYSTEM
Filed Sept. 9, 1966
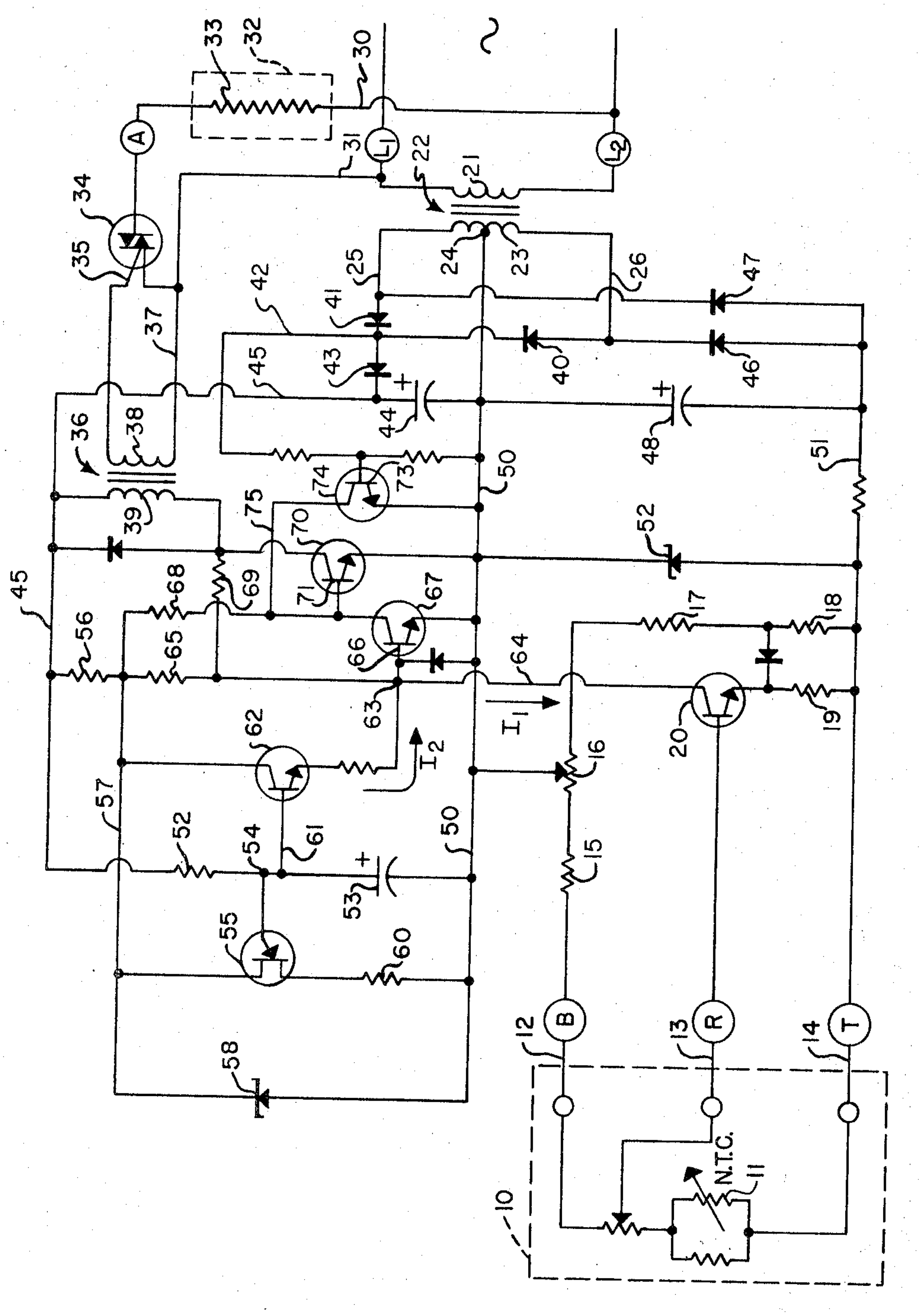
INVENTOR.
BALTHASAR H. PINCKAERS
BY Alfred N. Feldman
ATTORNEY

United States Patent Office 3,443,124
Patented May 6, 1969

3,443,124

MODULATING CONDITION CONTROL SYSTEM

Balthasar H. Pinckaers, Edina, Minn., assignor to Honeywell Inc., Minneapolis, Minn., a corporation of Delaware Filed Sept. 9, 1966, Ser. No. 578,321
Claims priority, application Germany, Aug. 9, 1966, 60,192
Int. Cl. H03k *17/56*
U.S. Cl. 307—252 9 Claims

ABSTRACT OF THE DISCLOSURE

A solid state modulating condition control system responsive to temperature which operates a solid state power handling semiconductor means. The sensed condition is combined with a ramp signal to provide a control pulse to fire the power handling semiconductor means when the applied line voltage phase is near zero. This is accomplished by combining an unfiltered full wave signal to short out the control except at or near the zero phase point.

The present invention is broadly directed to a sensor and modulating condition responsive circuit that has a substantially proportional output to control the conduction of a power handling semiconductor switch of the type normally known or referred to as an SCR or a Triac. More specifically, the present disclosure is directed to a temperature sensor or thermostat that operates through a proportional bridge arrangement to control the firing of an SCR or Triac to an electric heating load so that firing of the SCR or Triac takes place at the zero voltage condition of the applied alternating current potential, thereby eliminating the generation of radio frequency interference.

In the control of power handling semiconductor switch means, such as SCR's and Triacs, two general approaches to firing of the switches can be taken. One is the present approach, that is firing the switch at the zero potential or zero phase condition, and the other is the approach of firing the semiconductor switch at some definite phase angle thereby controlling the power carried by the switch by allowing it to operate only during part of a cycle. The second approach described has a tendency to generate various degrees of radio frequency interference depending on the firing phase angle of the applied voltage. If this second type of arrangement is used, some type of radio frequency filtering must be used. This type of filtering can be very expensive and is not completely satisfactory. This applies especially to high power loads. The present invention fires the power handling semiconductor switch only as the applied alternating current voltage passes through zero so that the device does not generate any radio frequency interference. This is accomplished by an arrangement of circuits including a repetitive timing circuit that has a time-based electrical output that varies in magnitude, for instance a sawtooth generator, for providing a repetitive type of cycle for the device. Combined with the repetitive timing circuit is a condition responsive circuit means that has an electrical output that varies in magnitude in response to a sensed condition. Typical of this type of device is a negative temperature coefficient resistance thermostat and bridge arrangement for providing an electrical output responsive to a sensed temperature. These two signals are mixed in a switching circuit. The switching circuit is normally in a conductive state until an adequate signal is received from the timing circuit and the sensor to thereby control the switching circuit. The output of the switching circuit is fed through a pulse amplifying circuit. The pulse amplifying circuit normally would conduct if its input is not shorted, but the switching circuit keeps the input shorted out except when the switching circuit receives a signal indicating the need for a controlled output. Combined with the switching circuit is an unfiltered, full-wave rectified alternating current supply means that ultimately supplies a square wave to the pulse amplifier and keeps the pulse amplifier shorted out except for a very brief interval at each zero-voltage phase condition. When both the short circuiting conditions of the pulse amplifier are removed, a pulse is generated that triggers the semiconductor power handling switch means to fire it at the time when the applied voltage is zero.

The system described briefly above has a number of distinctly advantageous features. The system is capable of proportionally modulating by turning "on" the SCR or Triac for a fixed number of cycles, but always firing the SCR or Triac when the alternating current voltage passes through zero. This arrangement insures that no unwanted radio frequency interference is generated. The circuit also responds by combining a proportional input and a timing circuit input so that good modulation can be obtained. The circuit further has the distinct advantage of having an isolating transformer that completely isolates the line-voltage alternating current from the low-voltage control circuit so that any failure in the SCR or Triac will not apply line voltage to the balance of the circuit. The advantages described will become apparent when a detailed disclosure of the present circuit is provided in connection with the single figure in the present application. This single figure shown is a complete schematic diagram of an electric heat controller utilizing a Triac for controlling the power to a heater load and responding to a negative temperature coefficient resistance type of thermostat.

At 10 a thermostat means is disclosed that includes a negative temperature coefficient resistance 11 in a resistance network that is connected between three conductors, 12, 13, and 14. The thermostat means 10 is of a type commercially available and known as a T7023A Electronic Thermostat as manufactured by Honeywell Inc. The thermostat means 10 can be of any convenient type in which a sensing element is provided that is responsive to a condition and which varies in resistance with the condition sensed. The balance of elements within the thermostat means 10 are adjustable or fixed resistances for providing a set point and balance arrangement, as is well known in the art.

Conductors 12, 13, and 14 connect to a network of resistors 15, 16, 17, 18, and 19 along with transistor 20 to form a conventional type of bridge with one stage of transistor amplification. In effect, the thermostat means 10 and the balance of the circuit described forms a condition responsive circuit means that has an electrical output that varies in magnitude in response to a sensed condition, in this particular case, temperature.

In order to supply the bridge thus described with an operating potential, the present device is connected at terminals $L_1$ and $L_2$ to an alternating current voltage, such as a 240-volt source, which is the normal voltage used in an electric heating circuit. The 240-volt alternating current is supplied to a primary 21 of a transformer, generally shown at 22, and which has a step-down secondary winding 23. The secondary winding 23 is tapped at 24 and has a pair of output connections or conductors 25 and 26. The winding 23 is a conventional low-voltage winding that isolates and supplies low-voltage power for the present device from the 240-volt line voltage supplied to the balance of the system.

Connected to the terminals $L_1$ and $L_2$ are a pair of conductors, 30 and 31, that supply power to an electrical load 32 that is shown as resistance 33. The load 32, in the form of resistance 33, is an electric heater that modifies the temperature of a space and which space is monitored by the negative temperature coefficient resistance 11 in the thermostat means 10. The circuit to the heater or load 32 is completed at terminal A through a Triac 34. A Triac is a commercially available power handling semiconductor means that conducts in both directions upon the application of a suitable triggering input to its gate 35. The power handling semiconductor means 34 could be replaced by a pair of SCR's in a back-to-back relationship, as is well known in the art. The gate 35 is connected to a pulse transformer generally shown at 36. A conductor 37 connects to one terminal of the pulse transformer 36 at an output winding 38 with the other side of the output winding 38 connected to the gate 35 of the Triac 34. The transformer 36 supplies a triggering input from a primary winding 39, as will become evident later in the description, which is connected through the winding 38 to the gate 35 of the Triac 34 to turn the Triac 34 "on" at an appropriate time to conduct a bidirectional current flow from the 240-volt alternating current supply to energize the load 32.

The center-tapped transformer winding 23 is used to supply three different unidirectional voltages in the present system. The step-down voltage from a secondary 23 is connected through a pair of diodes 40 and 41 to a conductor 42. The voltage on conductor 42 is an unfiltered, full-wave rectified alternating current that forms one of the important operating voltages for the present invention. The utilization of the full-wave unfiltered rectified voltage on conductor 42 will be described in some detail after the more conventional power supply voltages are described.

Connected to rectifier 41 is a second rectifier 43 that is connected to a capacitor 44 that provides a filtered direct current voltage for the operation of the circuit in the upper left-hand portion of the drawing. The capacitor 44 filters the voltage obtained through the rectifier 43 and supplies this voltage generally on conductor 45 for part of the system.

The thermostat means 10 and the bridge circuit including the transistor 20 are powered by a voltage supplied from the transformer secondary 23 through two diodes 46 and 47 and a capacitor 48. This circuit provides a filtered direct current voltage that acts as the energizing voltage for the bridge and the voltage is applied with the positive connection on a common conductor 50 and a negative voltage on conductor 51. Across the voltage source formed by capacitor 48 is a Zener diode 52 that stabilizes the voltage keeping it quite constant so that the bridge circuit does not respond to any normal voltage variation in the system. This is a conventional voltage stabilization technique and will not be described further.

The voltage supplied on conductor 45 is connected to the operating circuits that it supplies through three different circuits. The first circuit is through conductor 45 to a resistor 52 and a capacitor 53 that forms a timing network. The resistance 52 and capacitor 53 cause a voltage rise at point 54 that is applied to a unijunction transistor 55. The unijunction transistor 55 is also supplied with voltage from conductor 45 through a resistor 56 on a conductor 57. The voltage between conductor 57 and the common conductor 50 is stabilized once again by a Zener diode 58 so that the voltage across the pair of bases of the unijunction transistor 55 is constant. With this arrangement, the voltage at 54 rises as a function of the resistance 52 and the capacitor 53 until the point 54 reaches a voltage level at which the unijunction 55 fires conducting through a resistor 60 to discharge the capacitor 53. The result of this arrangement is the generation of a sawtooth voltage between a conductor 61 and the conductor 50.

The sawtooth voltage thus generated is applied to a transistor 62 which forms an isolating circuit and couples the sawtooth waveform so that a sawtooth current $I_2$ flows into a junction 63 of the present circuit. It will be noted that the junction 63 is connected to a conductor 64 and is responsive to the transistor 20 of the previously described condition responsive circuit means. The sawtooth current $I_2$ at 63 therefore is added to a current $I_1$ in conductor 64 of the condition responsive circuit means controlled by the transistor 20. This arrangement is powered through a resistor 65 back to the conductor 57.

At this point it is apparent that the junction 63 has a sawtooth current $I_2$ applied to it as well as a current $I_1$ which is dependent on the output of the bridge transistor 20. These currents ($I_1$ and $I_2$) in turn are applied to a base 66 of a transistor 67 that is powered through a resistor 68 from the stabilized voltage across the Zener diode 58. The transistor 67 in conjunction with a transistor 70 forms a switching circuit means that conducts dependent on the total current applied to the junction 63 or the voltage on base 66 of the transistor 67.

The transistor 67 appears in the base circuit of the transistor 70 which is part of a pulse amplifier means. The transistor 70 is connected to the primary winding 39 of the pulse transformer 36 and then back to the voltage on conductor 45 so that when the transistor 70 is allowed to conduct, a current flows in the primary winding 39 to generate a pulse to trigger the Triac by means of the secondary winding 38 of the transformer 36. In the arrangement described so far, the transistor 70 is normally in a nonconductive state due to the fact that the transistor 67 appears between a base 71 and the reference conductor 50 and acts to short out the inputs to the transistor 70. It can thus be seen that whenever transistor 67 is conducting, the input of transistor 70 is shorted and transistor 70 is nonconductive. If an appropriate current or voltage is applied to the base 66 transistor 67 by the combination of currents from the sawtooth generator ($I_2$) and the bridge current ($I_1$) in the present system, the transistor 67 is regeneratively turned "off" to allow the transistor 70 to conduct fully thereby generating an output pulse. Transistor 67 (and thus also transistor 70) is operated regeneratively by the action of a positive feedback resistor 69 which comes into play whenever transistor 70 turns "off" or "on." Without the action of a circuit to be described, the transistor 70 would cycle "on" and "off" under the command of the total signal to base 66.

In order to synchronize the relatively long-lasting output pulse to the Triac 34 with the instant of time during which the alternating current supply voltage goes through zero, one further circuit is needed. The synchronizing pulse for this arrangement comes from the full-wave rectified, unfiltered alternating current voltage on conductor 42 that is applied to a base 73 of a transistor 74. The voltage applied to the base 73 of a transistor 74 is in the form of half-wave voltage pulses and is amplified by the transistor 74 and converted, in effect, to a square wave by causing the transistor 74 to conduct during most of the time the voltage is applied to the base 73. The transistor 74 generates a square-wave output having a very short or disproportionate "off" period. This "off" period of the square wave coincides substantially with the time when the applied voltage to the system is passing through zero or which condition is referred to as the zero-phase condition. The output of transistor 74 is applied by a conductor 75 to the base 71 of the transistor 70. It can thus be seen that whenever the transistor 74 is conducting the base 71 of transistor 70 is shorted out. The application of this synchronizing pulse combined with the output of transistor 67 controls the transistor 70 so that it can be fired only at a zero-phase condition and further only when the thermostat means 10 is indicating the need for heat from the heater 33. Whenever these two conditions exist simultaneously, the transistor 70 is allowed to conduct and the current flows through winding 39 to generate a pulse to turn "on" the Triac 34 to conduct current through the load 32.

With the circuit thus described, the Triac or power handling semiconductor means fires at each zero-phase condition of the applied alternating current as long as there is a need for heat as sensed by the thermostat means 10. In the present arrangement the power handling semiconductor means will normally fire so that a number of cycles pass through the load 32 each time heat is being called for. The modulation of the load 32 occurs as a time modulated function and not as a function of conduction of part of each individual applied voltage cycle. When the thermostat means 10 is satisfied, and the bridge transistor 20 decreases in output current $I_1$ sufficiently so that the combined currents of the transistor 20 and the sawtooth generator at point 63 no longer turns the transistor 67 "off," the transistor 70 is shorted out so that it cannot provide a pulse to the pulse transformer 36 and subsequently to the Triac 34 for firing the Triac to conduct through the load.

In the present invention, three major considerations are involved. The power handling semiconductor means is fired only as the applied voltage passes through the zero-voltage condition. The firing occurs as a function of the need and therefore is a proportional control that continuously monitors the need for the operation of the load. And, the present arrangement utilizes a pulse output transformer so that the high-voltage sections of the present device can be completely isolated from the low-voltage control section thereby providing a safe and very effective type of device. The disclosure in the present application is of a single preferred embodiment of the invention. The present invention could be carried out by the use of a number of different individual circuits which would accomplish the same end results and therefore the inventor wishes to be limited in the scope of his invention solely by the appended claims.

The embodiments of the invention in which an exclusive property or right is claimed are defined as follows:

1. A modulating condition control system for controlling an applied alternating current flow through power handling semiconductor switch means, including: repetitive timing circuit means having a time based electrical output that varies in magnitude; condition responsive circuit means having an electrical output which varies in magnitude in response to a sensed condition; switching circuit means having an input including both said timing output and said condition responsive output to switch an output of said switching circuit means when said inputs reach a predetermined magnitude; pulse amplifier means having an input connected to pulsating current supply means which has substantially no output at zero phase of the applied alternating current voltage and said amplifier means further connected to said switching circuit means output; said switching circuit means and said pulsating supply means shorting out the input to said pulse amplifying means to inactivate said pulse amplifier means except when it is desired to generate a trigger pulse output from said pulse amplifier means; and pulse output transformer means connected to said pulse amplifier means for initiating the current flow through power handling semiconductor means substantially at the zero-phase condition.

2. A modulating condition control system as described in claim 1, wherein the repetitive timing circuit means is a sawtooth type voltage generator.

3. A modulating condition control system as described in claim 2, wherein said sawtooth type voltage generator includes a unijunction transistor triggered by a resistor and capacitor circuit.

4. A modulating condition control system as described in claim 1, wherein said condition responsive circuit means includes condition sensing means in circuit with electrical bridge means wherein said condition sensing means controls the magnitude of the electrical output of the condition responsive circuit means.

5. A modulating condition control system as described in claim 4, wherein said condition sensing means is a thermostat including a negative temperature coefficient resistance for control of said bridge means.

6. A modulating condition control system as described in claim 1, wherein said pulsing current supply means is generated from an unfiltered full-wave rectified alternating current supply that is synchronized with an alternating current supply causing said current flow through power handling semiconductor means.

7. A modulating condition control system as described in claim 6, wherein said pulsating current supply means generates a square-wave voltage output.

8. A modulating condition control system as described in claim 1, wherein said repetitive timing circuit means is a sawtooth type voltage generator having an electrical output; and said condition responsive circuit means includes a negative temperature coefficient resistance thermostat in circuit with an electrical bridge means wherein said thermostat controls the magnitude of the electrical output of the condition responsive means and is combined with said sawtooth electrical output as an input to said switching circuit means.

9. A modulating temperature control system as described in claim 8, wherein said pulsating current supply means is generated from an unfiltered full-wave rectified alternating current supply that is synchronized with an alternating current supply causing said current flow through said power handling semiconductor means.

References Cited

UNITED STATES PATENTS

| | | | |
|---|---|---|---|
| 3,159,737 | 12/1964 | Dora | 219—501 |
| 3,252,010 | 5/1966 | Buttenhoff | 307—88.5 |
| 3,283,177 | 11/1966 | Cooper | 307—88.5 |
| 3,328,606 | 6/1967 | Pinckaers | 307—88.5 |
| 3,372,328 | 3/1968 | Pinckaers | 323—22 |

ARTHUR GAUSS, *Primary Examiner*.

R. C. WOODBRIDGE, *Assistant Examiner*.

U.S. Cl. X.R.

307—284, 305; 328—3; 340—227, 233